United States Patent
Greisinger

Patent Number: 5,280,927
Date of Patent: Jan. 25, 1994

[54] DIVIDED SEALING RING FOR SEAL MEMBERS IN CABLE FITTINGS

[75] Inventor: Martin Greisinger, Iserlohn, Fed. Rep. of Germany

[73] Assignee: RXS Schrumpftechnik-Garnituren GmbH, Fed. Rep. of Germany

[21] Appl. No.: 966,716

[22] Filed: Oct. 26, 1992

Related U.S. Application Data

[62] Division of Ser. No. 646,081, Jan. 28, 1991, abandoned.

Foreign Application Priority Data

Feb. 23, 1990 [DE] Fed. Rep. of Germany ....... 4005816

[51] Int. Cl.$^5$ .............................................. F16J 15/32
[52] U.S. Cl. .................................... 277/216; 277/218; 277/220; 277/222; 403/294
[58] Field of Search ............... 277/216, 218, 219, 220, 277/222, 223; 403/292, 294, 295, 298, 280, 300, 314; 285/910, 918

[56] References Cited

U.S. PATENT DOCUMENTS

| | | | |
|---|---|---|---|
| 462,278 | 11/1891 | Perry | 277/218 |
| 475,053 | 5/1892 | Cabana | 277/219 |
| 499,266 | 6/1893 | Voorhees | 277/272 |
| 623,982 | 5/1899 | Chesterton | 277/218 |
| 747,448 | 12/1903 | Lomasney | 277/218 |
| 749,969 | 1/1904 | Munson | 277/218 |
| 2,738,243 | 3/1956 | Sawyer | 277/219 |
| 3,245,693 | 4/1966 | Way | 277/222 |
| 3,452,452 | 7/1969 | Dore | 403/292 |
| 3,605,201 | 3/1970 | Peterson | 403/292 |
| 4,746,127 | 5/1988 | Nesthoff et al. | 277/207 A |

Primary Examiner—William A. Cuchlinski, Jr.
Assistant Examiner—Daniel G. DePumpo

[57] ABSTRACT

A divided sealing ring is provided for cable sleeves and the like is a hose-shaped sealing ring with cut ends joined by a connector element which bridges the contacting plane of the divided ring. Individual coupling elements are firmly mounted in the inside of the sealing ring and are mutually couplable to one another in an engaging fashion. As a result, optimum sealing conditions are created which are preserved even under mechanical or thermal stresses in the region of the seal.

16 Claims, 2 Drawing Sheets

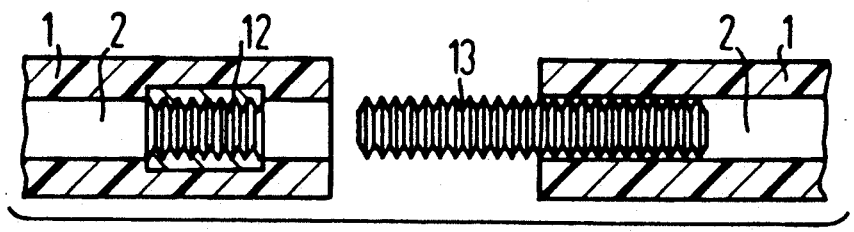
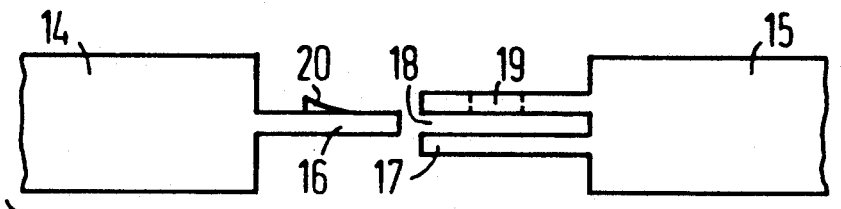
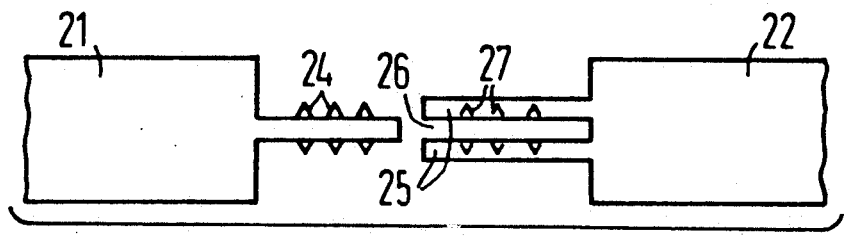
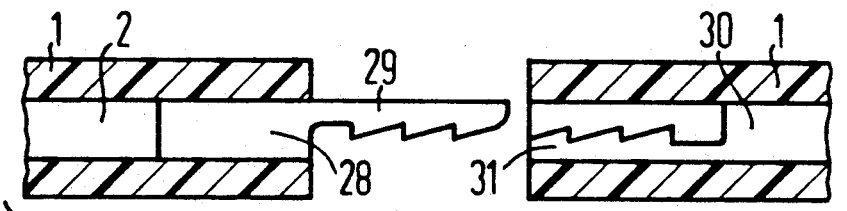
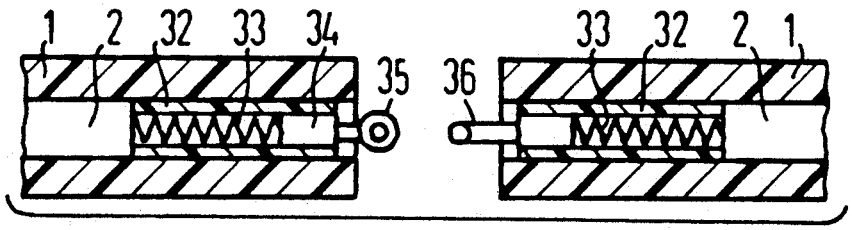
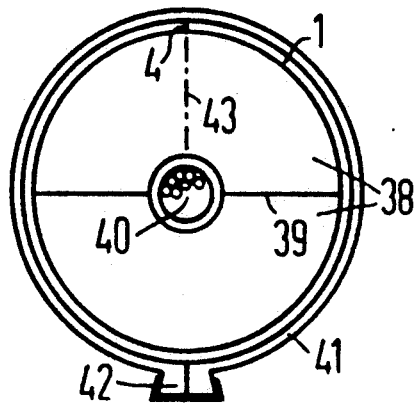

DIVIDED SEALING RING FOR SEAL MEMBERS IN CABLE FITTINGS

This is a division of application Ser. No. 646,081, filed Jan. 28, 1991 now abandoned.

BACKGROUND OF THE INVENTION

1. Field of the Invention

The present invention is related generally to a divided sealing ring for seal members and cable fittings wherein the seal ring is composed of an elastomeric hose having a connecting element that connects ends of the hose.

2. Description of the Related Art

A cable fitting or sleeve, such as to cover a splice in the cable, is generally composed of two end face seal members in which ports are provided for the introduction of the cables as well as an outer cylindrical sleeve member which is wrapped around the two end face members and extends therebetween to form an enclosure. The cylindrical sleeve is sealed to prevent the entry of water, for example, or gases. Among other things, an effective seal is needed between the outer circumference of the end face seal members and the inside wall of the cylindrical sleeve portion. Closed round seals, or O-rings, are generally used here.

However, when the sleeve is to be placed over an uncut cable or over a cable splice which has already been produced, the application of a closed sealing ring or O-ring is not possible. Thus, the sealing ring must be cut open and only then can be placed over the cable and, ultimately, on to the end face seal member. The seal ring must then be rejoined at its cut location to form an effective seal. Up to now, such a connection of the cut ends of the seal is performed by gluing the ends together in a centering form or device. The sealing ring is generally composed of a silicon rubber which is extremely well suited for sealing purposes. However, gluing the ends of such sealing ring produces a particularly unsatisfactory result since the curing time for such glue takes several hours.

A known divided round seal for sealing members is formed of a thick walled elastic hose which has been transversely divided or cut. A connecting pin is then introduced into the inside of the ends of the hose at the cut location for the purpose of bridging the cut ends. Disadvantages arise even when the surfaces of the connecting pin are appropriately shaped or roughened since the cut location may become leaky when the cable sleeve is subjected to mechanical stresses or to temperature fluctuations. Thus, the ineffectiveness of the seal at the cut location leads to problems.

FIG. 1 illustrates a problem which can occur in the hitherto used seal rings 1. In particular, cut ends 4 of the seal ring 1 separate to leave a wedge-shaped gap 3 when the seal ring 1 is mounted on a circular body of relatively small radius. The surfaces 4 lies at an angle 5 to a radius of the circular body, which gives rise yields to stresses so that the gap 3 arises.

In FIG. 2, the cut ring is mounted on a body of a relatively larger radius and, thus, a wide gap is not as likely to occur. However, even though the gap becomes smaller at larger diameters, a small gap is possible. The width of the gap 3 is thereby dependent on the radius of curvature.

SUMMARY OF THE INVENTION

An object of the present invention is to provide a cut or otherwise open sealing ring with a connecting location which guarantees a faultless seal even under stress. This and other objects and advantages of the invention are achieved with a divided sealing ring having a connector element composed of at least two coupling elements which engage one another. The coupling elements are rigidly mounted inside the hose-like sealing ring so that at least one of the coupling elements bridge the ends, or cut location, with a continuation.

An advantage of the present invention is mainly comprised in holding together the ends of the sealing ring at the parting location with an engaged connector element. The individual coupling elements are arranged within the hollow, hose-like sealing ring such that the parting surfaces or cut surfaces of the sealing ring are pressed against one another even after the engagement of the coupling elements. An adequate pressing power or force that keeps the cut location or parting location of the sealing ring tight even under mechanical and thermal stresses is guaranteed in this way.

It is also expedient to arrange the parting surfaces at the ends of the sealing ring obliquely opposite one another, such that the common contacting surface of the two parting surfaces lies in a radial plane after engagement. This uniformly distributes the pressing power or force of the ends over the entire end surface. This also prevents an outwardly spread wedge shaped gap 3 from being formed at the contacting surfaces 4 when the curvature of the sealing ring is in accordance with the diameter of the end face seal member, as was hitherto the case as shown in FIG. 1.

BRIEF DESCRIPTION OF THE DRAWINGS

The invention shall now be set forth in greater detail with reference to the figures.

FIG. 9 is an enlarged cross section in exploded view of a third exemplary embodiment of a connector in a seal ring which includes a sleeve and a bridging continuation;

FIG. 10 is an enlarged side view of coupling elements of the invention shown prior to connection and without the seal ring wherein the coupling elements include a catch tongue and catch groove;

FIG. 11 likewise is an enlarged side view of only the coupling elements prior to connection showing another form of a catch tongue and a catch groove;

FIG. 12 is an enlarged cross section of longitudinally divided coupling elements mounted in the ends of the hollow seal ring, the coupling elements being engagable inside the sealing ring overlapping one another;

FIG. 13 is an enlarged cross section of coupling elements mounted in a sealing ring which includes spring elements and a hook and eye; and FIG. 14 is an end view of an end face seal member mounted on a cable with a cable sleeve mounted around the end face seal member and a sealing ring mounted therebetween.

DETAILED DESCRIPTION OF THE PREFERRED EMBODIMENTS

Figure 1:
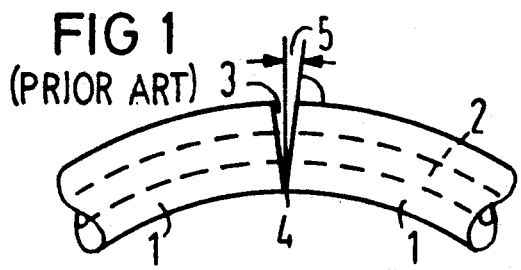
FIG. 1 shows a cut location in a sealing ring of the prior art which is mounted at a small radius of curvature.
Figure 2:
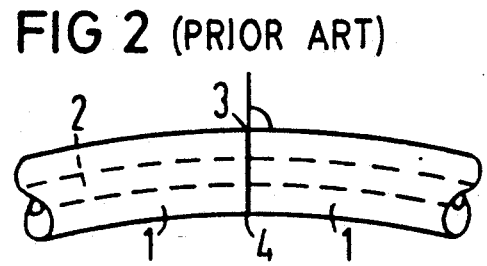
FIG. 2 shows a cut location of a sealing ring of the prior art mounted at a larger radius of curvature.

As already mentioned, FIGS. 1 and 2 show the connections of a sealing ring 1 of the prior art. The risk that is present in such sealing rings is that leaks will occur due to the formation of a gap 3 in the common connecting plane 4. The size of the gap 3 which results is essentially dependent upon the radius of curvature of the sealing ring 1 and thus on the diameter of the seal member on which it is mounted.

Figure 3:
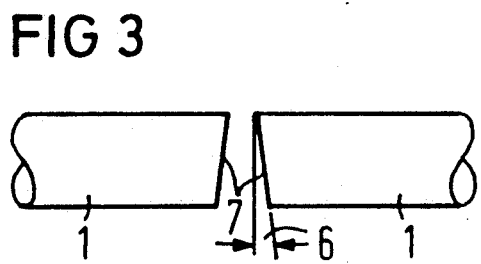
FIG. 3 shows a portion of a sealing ring with the ends at the parting or cut location being formed in accordance with the principles of the present invention.

In FIG. 3 is shown one possibility for considerably improving the sealing connections at the contacting plane 4 in conformity with the principles of the present invention. Dividing surfaces, or cut surfaces, 7 at each end of the sealing ring 1 are angled off at an angle 6 to an axis of the cylindrical sealing ring, the angle 6 depending upon the radius of curvature of the mounted sealing ring 1. The two dividing surfaces 7 are thus inclined toward one another when the ends of the sealing ring 1 are aligned in a straight line.

Figure 4:
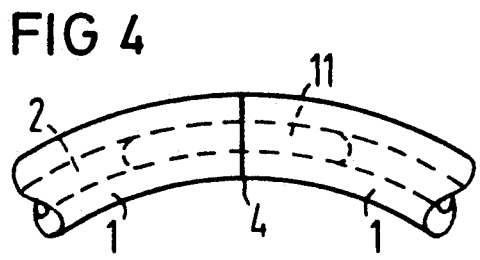
FIG. 4 shows a portion of a seal ring according to the present invention at a small radius of curvature after the ends are joined.

As shown in FIG. 4, the sealing ring 1 with the angled dividing surfaces has its ends joined in a common contacting plane 4 in the assembled condition even when curved about a relatively small radius. These ends are slanted or angled in accordance with the conditions shown in FIG. 3. By forming the ends at an angle, the entire contacting plane 4 is subject to substantially equal forces and spacing so that a gap can no longer form when the ring is placed around a circular end face member.

FIG. 4 also shows a connector element 11 embedded in the inside of the hollow sealing ring 1, the connector element 11 having a continuation extending through the contacting plane 4. As initially described, simple connector elements are already known. The known type, however, is not adequate to be able to guarantee a reliable seal in the contacting plane 4. When subject to mechanical and/or thermal stresses on the cable sleeve, the ends of the sealing ring 1 may slide on this simple connector element 11 to leave a gap so that leaks at the parting surface 4 may arise as a result thereof, and may even slide off the connector element 11.

Various embodiments of the present invention which prevent the problems described above are disclosed herein below.

Figure 5:
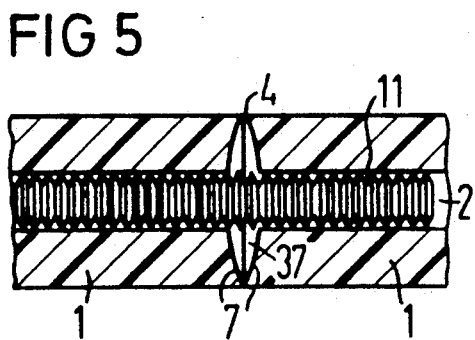
FIG. 5 is an enlarged cross section in the region of the joining plane of a seal ring showing the parting surfaces having a concave form.

FIG. 5 shows a partial view in the joining region of a sealing ring 1, wherein the parting surfaces 7' have been modified to a concave form in addition to being cut at a slant or angle so that the outside regions of the parting surfaces 7' are more highly stressed than an inside region 37. This provides the advantage that the parting surfaces 7' are joined with a greater pressing force at the outside edges when the ends of the sealing ring are pressed together. This adds further reliability to the seal by applying unequal stresses at the contacting surface 4.

A connector element 11 having a grooved surface as is known in the prior art is shown in FIG. 5 in the inside 2 of the sealing ring 1. Since the inside wall of the sealing ring 1, however, is smooth, the ends of the sealing ring 1 can nonetheless slide along the connector element 11 so that the pressing force decreases at the contacting plane. Despite the described improvement of forming the parting surfaces 7' as shown, an absolute reliability of the seal is not yet always established and the concave formation of the dividing surfaces 7' provides only a slight improvement over the prior art. Decisively better sealing conditions with a greater reliability derive when connector elements of the present invention are used, however.

Figure 6:
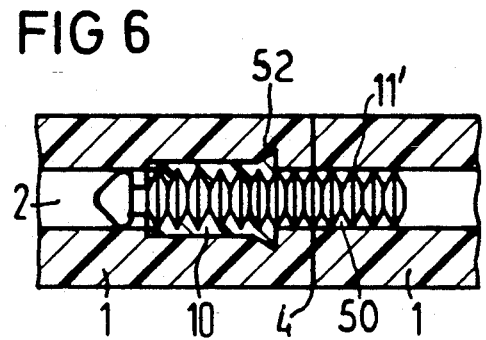
FIG. 6 is an enlarged cross section of a portion of a seal ring at the joining plane showing connector elements composed of a sleeve and of a continuation that bridges the parting location wherein the connector elements are shown in an assembled condition.

A first exemplary embodiment of a connector in accordance with the present invention is shown in FIG. 6. This connector guarantees that the sealing conditions, once produced, are preserved even when the sealing ring 1 is subject to stresses. A connector formed of connector elements 10 and 11' shown in FIG. 6 include a bridging coupling element 11', having, for example, a grooved surface and extending through the contacting plane 4 into the ends of the sealing ring 1. The bridging coupling element 11' is engaged into a second coupling element 10 fashioned as a sleeve having a grooved surface corresponding to the grooves on the bridging element 11'. The sleeve 10 is firmly engaged within one end of the sealing ring 1 and the second coupling element 11', formed as a continuation extending beyond the end in which it is mounted, is firmly engaged into the other end, for example, by gluing, clamping, or bracing. In FIG. 6, glue 50 holds the bridging element 11' in the hollow end of the seal ring 1, while a bracing 52 in the form of a conical flange secures the sleeve 10 in the other hollow end of the sealing ring 1.

The sleeve 10 is set back from the dividing plane 4 into the inside 2 of the sealing ring to such an extent that the elasticity of the material of the sealing ring is used to initially resiliently engage the connecting members. In other words, the material at the ends of the seal ring 1 is compressed against one another to engage the connector elements and remains compressed after the engagement. Subsequently, a pressing force is produced by the elasticity of the sealing ring material in the contacting plane 4 so that sealing conditions there are promoted. As a consequence of the engagement of the coupling elements 10 and 11' with each other, it is no longer possible for the ends of the sealing ring 1 to slide along or even off the connector so that leaks that result from mechanical or thermal stresses at the sealing region no longer arise.

Figure 7:
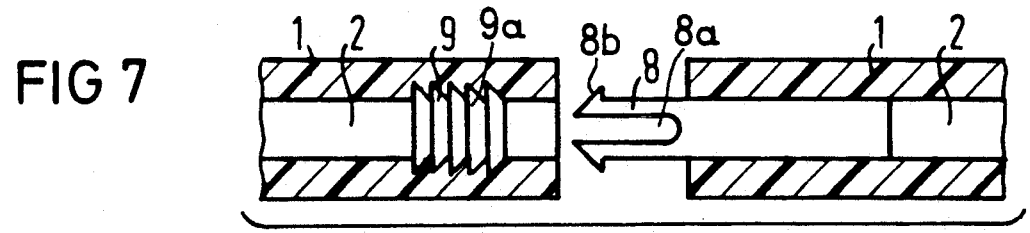
FIG. 7 is an enlarged cross section of a further exemplary embodiment of connector elements including a sleeve region and a bridging connection in a seal ring according the present invention wherein the connector elements are shown in an exploded view not yet connected.

With reference now to FIG. 7, the ends of the sealing ring are provided with a connector element 8 and 9 composed of a sleeve region 9 set back into the inside of the tube from the end, as well as a coupling element having a continuation 8 that bridges the contacting plane. The continuation 8 is longitudinally slotted at 8a and has barbs 8b at the end which spread open in a hooking fashion into grooves 9a in the sleeve 9 after introduction into the sleeve region 9. Due to the set-back of the sleeve region 9 from the end of the sealing ring, the elasticity of the material of the sealing ring 1 is again exploited so that, corresponding to the set-back distances, the necessary pressing forces are achieved at the contacting plane to maintain an effective seal. In FIG. 7, the sleeve region 9 is molded into the inner wall of the sealing ring rather than being a separate sleeve element as shown in FIG. 6.

Figure 8:
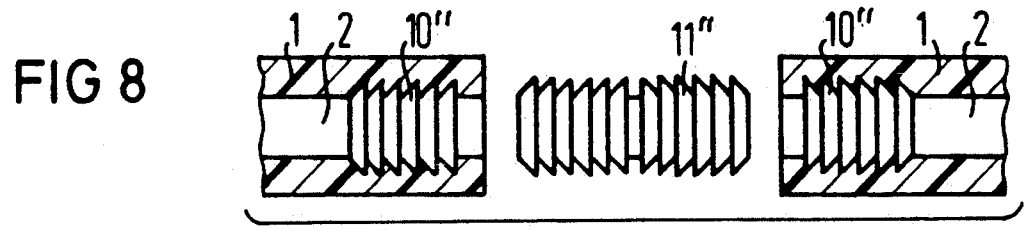
FIG. 8 is a an enlarged cross section, also in an exploded view, of an exemplary embodiment of a connector composed of two sleeve regions and a bridging continuation in a seal ring.

In FIG. 8 is shown an exemplary embodiment of a connector element 10″ and 11″ comprising a profiled sleeve region 10″ in each end of the sealing ring 1. A continuation 11″ formed with a correspondingly profiled outer surface is provided as the bridging element through the contacting plane 4. The continuation 11″ is pressed and hooked into both sleeve region 10″ in an engaging fashion. Such engagement thus secures the connecting location in a sealed relationship at the ends of the sealing ring 1.

Yet another embodiment is shown in FIG. 9, including connector elements 12 and 13 of the invention which have a firmly mounted sleeve 12 in the inside 2 of one end of the sealing ring 1. A continuation 13 which is formed resiliently with a longitudinal slot (not visible in the side view) is introduced into the sleeve 12 as the coupling element. The continuation 13 has a profiled surface which mates with the sleeve 12 so that a reliable seating of the ends of the sealing ring against one another is also guaranteed here.

For the sake of clarity, the connector elements 14 and 15 are shown enlarged in FIG. 10 without the hollow sealing ring. The coupling elements are to be firmly introduced into the inside 2 of the sealing ring 1 when used. In FIG. 10, one coupling element 14 is formed with a catch tongue 16 having a resilient catch element or projection 20, the tongue being insertable in engaging fashion into a catch groove 18 of the second coupling element 15. This catch groove 18 is formed by two tabs 17, although other forms are also possible. In the ultimate engaged condition, the catch element 20 engages into a recess 19 in one side of the groove 18, as a result thereof the ends of the seal ring are again fixed firmly together. Of course, to accomplish this, the coupling elements 14 and 15 are set back from the ends of the seal ring.

In FIG. 11 is shown a variation on the embodiment shown in FIG. 10. A plurality of the hook-shaped elements 24 are arranged on the catch tongue 23 on both sides, the hook-shaped elements hooking into corresponding cooperating elements or spaces 27 in the catch grooved 26 which is formed by two tabs 25.

Referring to FIG. 12, an exemplary embodiment of connector elements 28 and 30 comprising a coupling element 28 and a coupling element 30. Each of the coupling elements include a continuation 29 or 31, respectively. The one coupling element 30 has its continuation 31 arranged set back in the inside 2 of the sealing ring so that only the second continuation 29 of the coupling element 28 bridges the contacting plane of the sealing ring 1. The continuation 29 interacts with the continuation 31 by hooking, and the sealing ring 1 acts as a sleeve to retain the two continuations engaged to one another and thus retain the ends of the sealing ring in an engaged position.

A further embodiment shown in FIG. 13 includes two springs 33 which are introduced into respective coupling elements 32 and 32. Springs may also generally be used with other embodiments of connectors, including those shown above. Here, however, the spring elements 33 are each arranged in guide sleeves 32 which are firmly affixed in the inside 2 of the ends of the sealing ring 1. A hook 36 is affixed to one end of one of the springs 33 and an eye 35 is affixed to the end of the other spring 33. The hook 36 and eye 35 shown here are the actual coupling elements, although other types of catch means may alternately be provided. Given the illustrated embodiment, the necessary pressing forces at the contacting plane can be even more designationally defined.

FIG. 14 shows an application of a sealing ring 1 on the circumference of a divided end face member 38 of a cable sleeve. The sealing ring 1 serves as the seal element between the end face member 38 and a socket pipe or sleeve 41. Two of such end face members 38 arranged at the opposite ends of a region to be enclosed, one of the seal rings 1 is mounted on each of the end face members, and the sleeve is mounted over the end face members with the assistance of a closure mechanism 42 to enclose and seal off the region. An imaginary radial plane 43, shown by a broken line, is in line with the contacting plane 4 of the sealing ring 1 of the invention. It should be understood that this contacting plane lies in the imaginary radial plane 43 as a consequence of the oblique cuts at the ends of the sealing ring.

As a further embodiment, particularly for large curvatures, i.e. small diameters, of end face sealing members, it is recommended that the bridging continuations be likewise bent in conformity with the curvature of the mounted sealing ring. A further matching in this parting region is thereby established.

The connector elements of the present invention are essentially composed of plastic and preferably of polyethylene, although metal may also be used for this purpose. A combination of metal and plastic material may also be used under certain circumstances. The sealing ring is composed of an elastomeric material and preferably of silicone rubber.

As previously mentioned, the parting surfaces are cut surfaces of the sealing ring proceed obliquely at the ends thereof. Even this can be foregone by corresponding sizing of the distances between the coupling elements in combination with the elasticity of the material of which the seal ring is formed. The parting surfaces, thus, lie parallel to one another and perpendicular to the longitudinal extent of the sealing ring. Catch elements of the coupling elements may be formed both detachably as well as non-detachably so that the connection is either separable or permanent, respectively. The detachable configuration of the coupling elements promotes manipulation for doing repair work, for example. As in the case of the embodiments shown in FIGS. 10, 11, 12, or 13, a particular advantage is provided when the coupling elements are secured against turning relative to one another.

As needed, the parting surfaces may also be formed with profiles or labyrinth seals, such as when sealing conditions are critical.

Although other modifications and changes may be suggested by those skilled in the art, it is the intention of the inventor to embody within the patent warranted hereon all changes and modifications as reasonably and properly come within the scope of his contribution to the art.

I claim:

1. A dividing sealing ring for seal members in cable fittings, comprising:
   a sealing ring comprising an elastic hose of an elastomeric material with a cut location defining a contacting plane between two opposite end surfaces of said elastic hose, said two opposite end surfaces of said seal ring each being concavely formed; and
   a connector including at least two coupling elements that engage one another, at least one of said coupling elements having a continuation bridging said contacting plane; said coupling elements being firmly mounted in respective ends of said sealing ring.

2. A divided sealing ring as claimed in claim 1, wherein at least one of said coupling elements is set back inside an end of said sealing ring to such an extend such that engagement of said two coupling elements to one another compresses said elastomeric material of said sealing ring at said ends and results in said ends of said sealing ring pressing elastically against one another.

3. A divided sealing ring as claimed in claim 1, further comprising:
   glue affixing at least one of said coupling elements in said sealing ring.

4. A divided sealing ring as claimed in claim 1, further comprising:
   a brace affixing said coupling elements in said sealing ring.

5. A divided sealing ring as claimed in claim 1, wherein said coupling elements are formed so as to be non-detachably joinable to one another.

6. A divided sealing ring as claimed in claim 1, wherein said coupling elements are formed so as to be detachably joinable to one another.

7. A divided sealing ring as claimed in claim 1, wherein said dividing surfaces are perpendicular to a longitudinal extent of said sealing ring and are parallel to one another before said elastic hose is formed into said sealing ring.

8. A divided sealing ring as claimed in claim 1, wherein said dividing surfaces are inclined relative to one another at their ends lying opposite one another so that a common contacting plane of the dividing surfaces lies in a radial plane of said seal ring after said sealing ring is circularly joined.

9. A divided sealing ring as claimed in claim 1, wherein one of said coupling elements is a sleeve region and another of said coupling elements includes a slotted continuation which is introducible into said sleeve region for spreading open in an engaging fashion after introduction into said sleeve region.

10. A divided sealing ring as claimed in claim 1, wherein said continuation bridges said contacting surface, said continuation being curved to adapt to a curve of said seal member.

11. A divided sealing ring as claimed in claim 1, wherein said coupling elements are formed to resist relative turning.

12. A divided sealing ring as claimed in claim 1, wherein said coupling elements are of polyethylene.

13. A divided sealing ring as claimed in claim 1, wherein said coupling elements are of metal.

14. A divided sealing ring as claimed in claim 1, wherein one of said coupling elements is of a first material, and another of said coupling elements is of a second material, wherein said first material is different than said second material.

15. A divided sealing ring as claimed in claim 1, wherein said sealing ring is of silicone rubber.

16. A divided sealing ring for seal members in cable fittings, comprising:
   a sealing ring comprising an elastic hose of an elastomeric material with a cut location defining a contacting plane between two opposite end surfaces of said elastic hose, said two opposite end surfaces of said sealing ring each being concavely formed; and
   a connector including at least two coupling elements comprising at least one profiled sleeve in at least one end of the sealing ring and a continuation bridging said contacting plane, said at least two coupling elements being firmly mounted in respective ends of said sealing ring and said continuation being formed with a correspondingly profiled outer surface.

* * * * *